US012036878B2

(12) United States Patent
Uemura et al.

(10) Patent No.: US 12,036,878 B2
(45) Date of Patent: Jul. 16, 2024

(54) POWER SUPPLY DEVICE, VEHICLE HAVING POWER SUPPLY DEVICE, AND POWER STORAGE DEVICE

(71) Applicant: SANYO Electric Co., Ltd., Osaka (JP)

(72) Inventors: Yasuaki Uemura, Hyogo (JP); Shingo Ochi, Hyogo (JP); Takuya Egashira, Hyogo (JP); Masato Koutari, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 777 days.

(21) Appl. No.: 17/267,309

(22) PCT Filed: Jul. 26, 2019

(86) PCT No.: PCT/JP2019/029343
§ 371 (c)(1),
(2) Date: Feb. 9, 2021

(87) PCT Pub. No.: WO2020/059296
PCT Pub. Date: Mar. 26, 2020

(65) Prior Publication Data
US 2021/0344076 A1    Nov. 4, 2021

(30) Foreign Application Priority Data
Sep. 20, 2018  (JP) ................................ 2018-176648

(51) Int. Cl.
*B60K 1/04*    (2019.01)
*B60L 50/64*   (2019.01)
(Continued)

(52) U.S. Cl.
CPC ......... *B60L 50/64* (2019.02); *H01M 10/0525* (2013.01); *H01M 10/46* (2013.01);
(Continued)

(58) Field of Classification Search
CPC ............ H01M 10/0525; H01M 10/46; H01M 50/249; H01M 50/264; H01M 50/209;
(Continued)

(56) References Cited

U.S. PATENT DOCUMENTS 9,537,130 B2 *   1/2017  Yoon ................... H01M 50/308
10,388,923 B2 *  8/2019  Takahashi ........... H01M 50/262
(Continued)

FOREIGN PATENT DOCUMENTS

JP    2006-185815 A    7/2006
JP    2015-220117      12/2015

OTHER PUBLICATIONS

English Translation of Search Report dated Aug. 3, 2022, issued in Counterpart to CN Application No. 201980058856.5. (2 pages).
(Continued)

*Primary Examiner* — Jason D Shanske
*Assistant Examiner* — James J Triggs
(74) *Attorney, Agent, or Firm* — WHDA, LLP

(57) ABSTRACT

Power supply device includes: a pair of end plates disposed on both ends in a stacking direction of battery stack constituted by stacking a plurality of secondary battery cells; and a plurality of fastening members fastening the pair of end plates together. Each of fastening members includes fastening main face having a flat plate shape and locking block fixed to a corner of fastening main face Each of end plates is formed with step that locks locking block while being fastened by fastening members, and has end plate screw hole opened near step. Each of fastening members has fastening side through hole opened so as to align with end plate screw hole while having each of end plates fastened, and has a fixing region fixing locking block to fastening main face disposed in a direction further away from each of end plates than fastening side through hole.

9 Claims, 14 Drawing Sheets

(51) Int. Cl.
  *H01M 10/0525* (2010.01)
  *H01M 10/46* (2006.01)
  *H01M 50/209* (2021.01)
  *H01M 50/224* (2021.01)
  *H01M 50/249* (2021.01)
  *H01M 50/264* (2021.01)
  *H02J 7/00* (2006.01)
  *B60K 6/28* (2007.10)
  *H02J 7/35* (2006.01)
  *H02P 27/06* (2006.01)

(52) U.S. Cl.
  CPC ....... *H01M 50/209* (2021.01); *H01M 50/224* (2021.01); *H01M 50/249* (2021.01); *H01M 50/264* (2021.01); *H02J 7/0013* (2013.01); *B60K 6/28* (2013.01); *B60Y 2200/91* (2013.01); *B60Y 2200/92* (2013.01); *B60Y 2400/112* (2013.01); *H01M 2220/20* (2013.01); *H02J 7/35* (2013.01); *H02P 27/06* (2013.01)

(58) Field of Classification Search
  CPC .... H01M 2220/20; B60L 50/64; H02P 27/06; B60Y 2400/112; B60Y 2200/91; H02J 7/0013; B60K 6/28
  See application file for complete search history.

(56) References Cited

U.S. PATENT DOCUMENTS

| | | | | |
|---|---|---|---|---|
| 10,631,429 | B2* | 4/2020 | Pradeepkumar .. | H01M 10/6556 |
| 10,868,287 | B2* | 12/2020 | Farha ................ | H01M 10/6554 |
| 11,177,525 | B2* | 11/2021 | Fan .................... | H01M 50/342 |
| 2011/0151309 | A1* | 6/2011 | Park ................... | H01M 10/052 |
| | | | | 429/151 |
| 2013/0004813 | A1* | 1/2013 | Kim .................... | H01M 50/308 |
| | | | | 429/87 |
| 2013/0143082 | A1* | 6/2013 | Kim .................... | H01M 50/30 |
| | | | | 429/82 |
| 2015/0333305 | A1* | 11/2015 | Seki ................... | H01M 10/625 |
| | | | | 429/152 |

OTHER PUBLICATIONS

International Search Report of PCT application No. PCT/JP2019/029343 dated Oct. 15, 2019.
Office Action dated Jun. 15, 2022, issued in counterpart EP application No. 19 862 345.6. (3 pages).

* cited by examiner

POWER SUPPLY DEVICE, VEHICLE HAVING POWER SUPPLY DEVICE, AND POWER STORAGE DEVICE

CROSS-REFERENCE TO RELATED APPLICATIONS

This application is a U.S. national stage application of the PCT International Application No. PCT/JP2019/029343 filed on Jul. 26, 2019, which claims the benefit of foreign priority of Japanese patent application No. 2018-176648 filed on Sep. 20, 2018, the contents all of which are incorporated herein by reference.

TECHNICAL FIELD

The present invention relates to a power supply device, a vehicle having the power supply device, and a power storage device.

BACKGROUND ART

A typical power supply device includes a battery stack constituted of a plurality of quadrangular battery cells, a pair of end plates disposed on both end faces of the battery stack, and fastening members such as bind bars that couple the pair of end plates (see PTL 1). In this power supply device, by restraining the battery stack with the end plates and bind bars, the battery stack constituted of a plurality of quadrangular battery cells can be assembled.

CITATION LIST

Patent Literature

PTL 1: Unexamined Japanese Patent Publication No. 2015-220117

SUMMARY OF THE INVENTION

In the power supply device of PTL 1, because a battery stack is constituted by assembling a plurality of quadrangular secondary battery cells through the use of bind bars and end plates, the plurality of secondary battery cells constituting the battery stack are suppressed from being expanded. That is, because the expansion of the secondary battery cell is suppressed through the use of the bind bars and the end plates, large force is applied to the bind bars and the end plates.

On the other hand, in the quadrangular secondary battery cell, in the case of attempting to increase the energy density per volume or the energy density per weight, the dimensional change due to charging and discharging, or due to deterioration tends to become large. Because the load applied to the bind bars and the end plates is influenced by the amount of expansion of the secondary battery cell, when a secondary battery cell whose dimension is affected largely by the amount of expansion is used, the power supply device having a configuration of PTL 1 will cause a large amount of load to be applied to the end plates and the bind bars, and the end plates and bind bars may be deformed or damaged.

The present invention has been made in view of such a background, and one of objects of the present invention is to provide a power supply device having improved stiffness and a vehicle provided with the power supply device.

The power supply device according to one aspect of the present invention includes: a battery stack constituted by stacking a plurality of secondary battery cells; a pair of end plates disposed on both ends in a stacking direction of the battery stack; and a plurality of fastening members fastening the pair of end plates together. Each of the fastening members includes a fastening main face having a flat plate shape and a locking block fixed to a corner of the fastening main face, each of the end plates is formed with a step that locks the locking block while being fastened by the fastening members and has an end plate screw hole opened near the step, each of the fastening members has a fastening side through hole opened so as to align with the end plate screw hole, while having each of the end plates fastened, and has a fixing region fixing the locking block to the fastening main face disposed in a direction further away from each of the end plates than the fastening side through hole.

According to the above power supply device, the region that fixes the locking block to the fastening main face is separated from the fastening side through hole to mitigate the concentration of stress and facilitate securing of a large area. Therefore, there is an advantage of improving the bonding strength between the locking block and the fastening main face to improve reliability.

DESCRIPTION OF EMBODIMENTS

Figure 1:
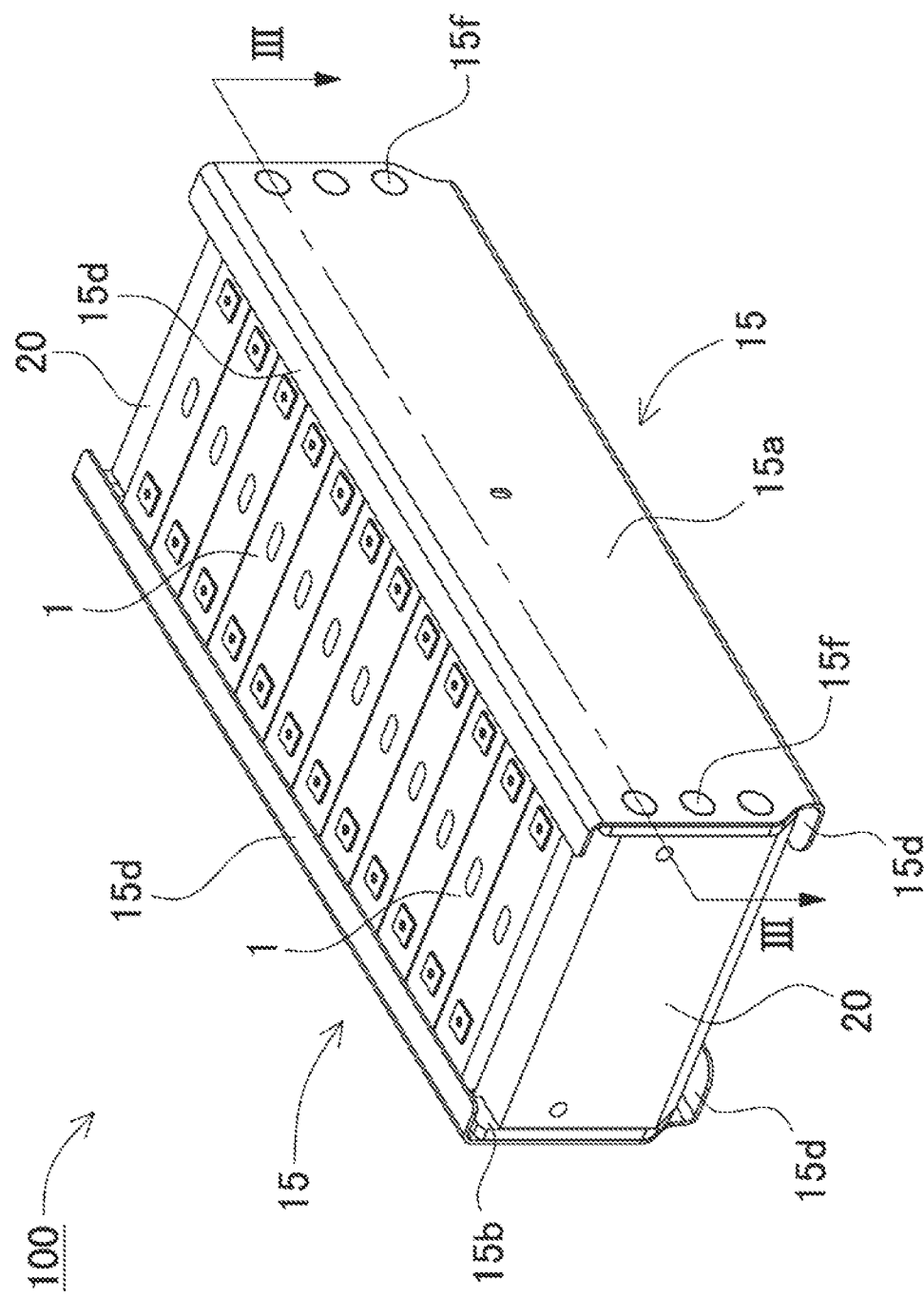
FIG. 1 is a perspective view showing a power supply device according to a first exemplary embodiment.

A power supply device according to one exemplary embodiment of the present invention includes: a battery stack constituted by stacking a plurality of secondary battery cells; a pair of end plates disposed on both ends in a stacking direction of the battery stack; and a plurality of fastening members fastening the pair of end plates together. Each of the fastening members includes a fastening main face having a flat plate shape, and a locking block fixed to a corner of the fastening main face, the end plate is formed with a step that locks the locking block while being fastened by the fastening members and has an end plate screw hole opened near the step, and the fastening member has a fastening side through hole opened so as to align with the end plate screw hole, while having the end plate fastened, and has a fixing region fixing the locking block to the fastening main face disposed in a direction further away from the end plate than the fastening side through hole.

Further, in the power supply device according to another exemplary embodiment of the present invention, a plurality of the fastening side through holes are disposed so as to extend in the extending direction of the locking block. With the above configuration, by securing the locking block wider than a region to be welded to the fastening main face, there is an advantage of improving the bonding strength between the locking block and the fastening main face to improve reliability.

Further, in the power supply device according to another exemplary embodiment of the present invention, a plurality of the fastening side through holes are disposed on a first straight line so as to extend in the extending direction of the locking block, a plurality of fixing regions at which the locking block is fixed to the fastening main face are disposed on a second straight line different from the first straight line along the extending direction of the locking block, and the second straight line is disposed in a direction further away from the end plate than the first straight line. With the above configuration, by mitigating the concentration of stress by separating the plurality of fixing regions from the fastening side through holes, and meanwhile, easily securing a large area, there is an advantage of improving the bonding strength between the locking block and the fastening main face to improve reliability.

Further, in the power supply device according to another exemplary embodiment of the present invention, the locking block is fixed to the fastening main face by spot welding. With the above configuration, by securing the locking block wider than a region to be welded to the fastening main face, there is an advantage of improving the bonding strength between the locking block and the fastening main face to improve reliability.

Furthermore, in the power supply device according to another exemplary embodiment of the present invention, the fastening side through hole has a notch shape that opens an end edge on the side of the locking block facing the end plate. With the above configuration, by relatively reducing the stiffness of the locking block, the stress received by the locking block can be shared with the fastening main face, and therefore, it becomes possible to avoid the situation of the stress being concentrated on the fastening main face side and to increase the resistance.

Furthermore, according to the power supply device according to another exemplary embodiment of the present invention, the locking block has one or more second notches that open the end edge on the side facing the end plate at a position different from the fastening side through hole. With the above configuration, by relatively reducing the stiffness of the locking block, the stress received by the locking block can be shared with the fastening main face, and therefore, it becomes possible to avoid the situation of the stress being concentrated on the fastening main face side and to increase the resistance.

Furthermore, in the power supply device according to another exemplary embodiment of the present invention, the locking block and the fastening main face are made of the same metal.

Furthermore, a vehicle according to another exemplary embodiment of the present invention includes the above power supply device, a running motor to which power is supplied from the power supply device, a vehicle body constituted by having the power supply device and the motor mounted, and wheels that are driven by the motor to make the vehicle body run.

Furthermore, the power storage device according to another exemplary embodiment of the present invention includes the power supply device and a power supply controller that controls charging and discharging of the power supply device, and the power supply controller enables to supply power from the outside to charge the secondary battery cell and performs control to charge the secondary battery cell.

The exemplary embodiments of the present invention are described below with reference to the drawings. However, the exemplary embodiments shown below are examples for embodying the technical idea of the present invention, and the present invention is not specified as the following. Further, the present description does not specify the members shown in the claims as the members of the exemplary embodiments. In particular, the dimensions, materials, shapes, relative arrangements, and the like of the components described in the exemplary embodiments are not intended to limit the scope of the present invention to that alone, and are merely explanatory examples unless otherwise specified. The size and positional relationship of the members shown in each drawing may be exaggerated to clarify the explanation. Further, in the following description, members of the same or the same quality are shown with the same name and reference numeral, and detailed description thereof is omitted as appropriate. Further, respective elements constituting the present invention may be configured such that the plurality of elements are constituted of the same member to form one member that functions as the plurality of elements, or conversely, the function of one member can be shared and achieved by the plurality of members. In addition, the contents described in some examples and exemplary embodiments can be used in other examples and exemplary embodiments.

The power supply device according to the exemplary embodiment is used in various purposes such as a power supply mounted on an electric vehicle such as a hybrid vehicle or an electric vehicle to supply electric power to a running motor, a power supply for storing generated power of natural energy generated by, for example, solar power generation or wind power generation, a power supply for storing power at midnight, or others, and is particularly suitable as a power supply suitable for high power and high current applications. In the following example, exemplary embodiments applied to a power supply device for driving a vehicle are described.

First Exemplary Embodiment

Figure 2:
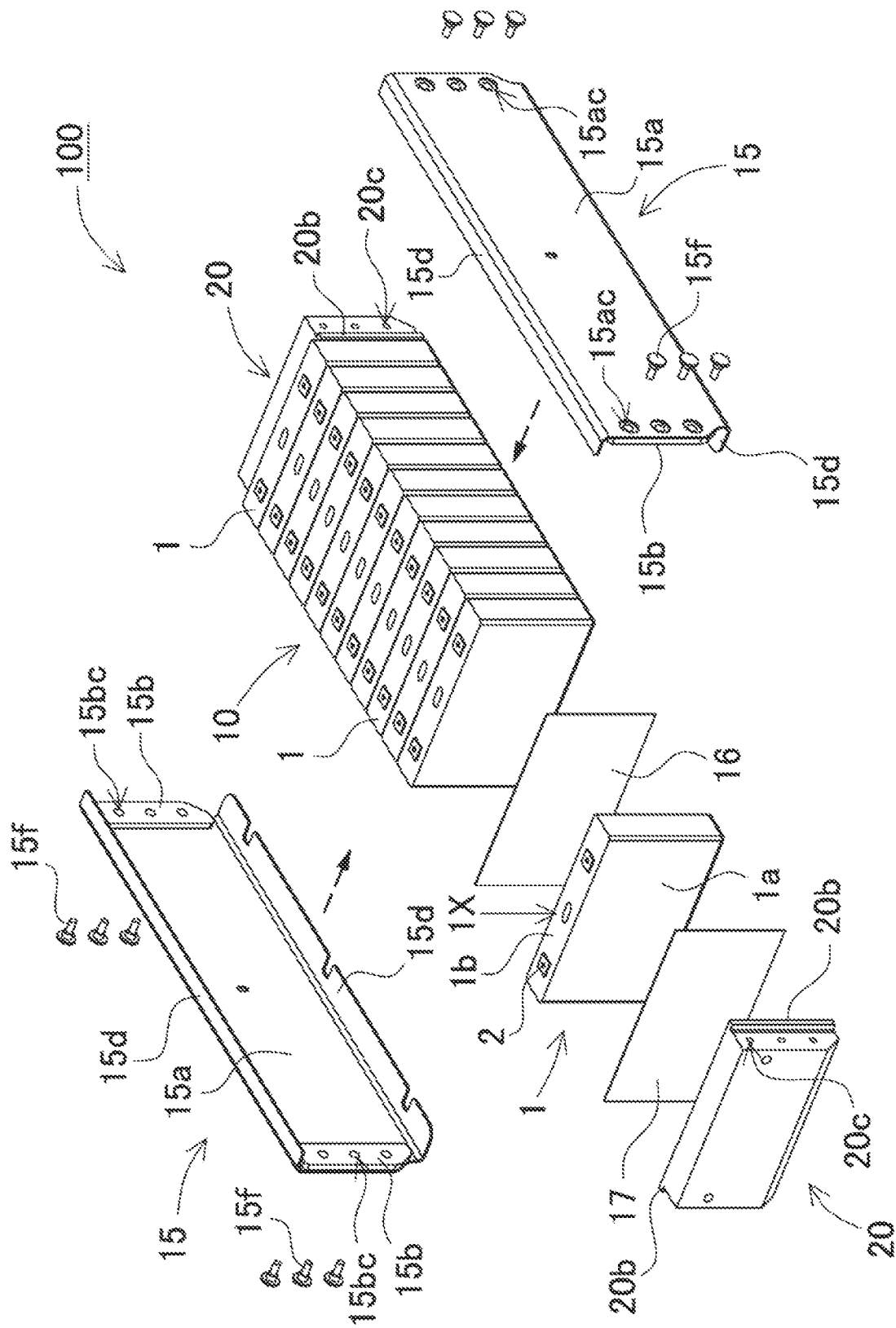
FIG. 2 is an exploded perspective view of the power supply device of FIG. 1.
Figure 3:
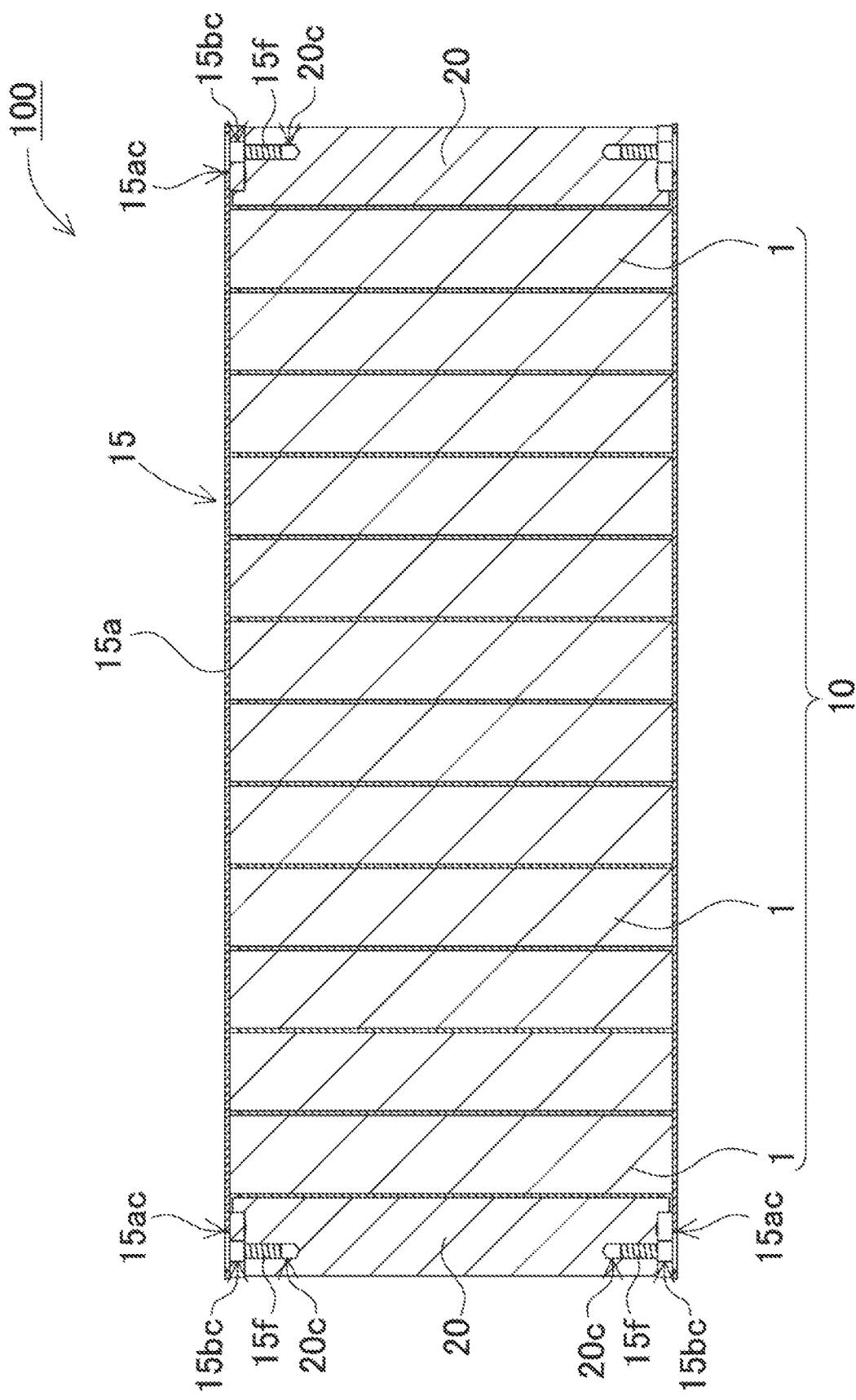
FIG. 3 is a horizontal sectional view taken along a line III-III of the power supply device of FIG. 1.

FIG. 1 shows a perspective view of power supply device 100 according to a first exemplary embodiment of the present invention, FIG. 2 shows an exploded perspective view thereof, and FIG. 3 shows a vertical sectional view taken along line III-III of power supply device 100 in FIG. 1. Power supply device 100 shown in these drawings includes battery stack 10 constituted by stacking a plurality of secondary battery cells 1, a pair of end plates 20 covering both end faces of battery stack 10, and a plurality of fastening members 15 fastening end plates 20 together.

(Battery Stack 10)

Battery stack 10 includes the plurality of secondary battery cells 1 having positive and negative electrode terminals 2, and bus bars (not shown) connected to electrode terminals 2 of the plurality of secondary battery cells 1 and connecting the plurality of secondary battery cells 1 in parallel and in series. The plurality of secondary battery cells 1 are connected in parallel or in series via these bus bars. Secondary battery cell 1 is a rechargeable secondary battery. In power supply device 100, the plurality of secondary battery cells 1 are connected in parallel to form a parallel battery group, and a plurality of parallel battery groups are connected in series to form a large number of secondary battery cells 1 connected in parallel and in series. In power supply device 100 shown in FIGS. 1 to 3, the plurality of secondary battery cells 1 are stacked to form battery stack 10. Further, a pair of end plates 20 are disposed on both end faces of battery stack 10. The ends of fastening members 15 are fixed to both end plates 20, to fix stacked secondary battery cells 1 in a pressed state.

(Secondary Battery Cell 1)

Secondary battery cell 1 is a quadrangular battery having a quadrangular outer shaped main face being a wide face, and whose thickness is made smaller than the width. Further, secondary battery cell 1 is a secondary battery that can be charged and discharged, and is a lithium ion secondary battery. However, the present invention does not specify the secondary battery cell as the quadrangular battery, nor does the present invention specify the lithium ion secondary battery. As the secondary battery cell, all rechargeable batteries such as a non-aqueous electrolyte secondary battery other than the lithium ion secondary battery, and a nickel hydrogen secondary battery cell can also be used.

As shown in FIG. 2, in secondary battery cell 1, an electrode body in which positive and negative electrode plates are stacked is accommodated in exterior can 1a, filled with an electrolytic solution, and airtightly sealed. Exterior can 1a is formed into a quadrangular cylinder closed at the bottom, and an opening at an upper part of exterior can 1a is airtightly closed by metal plate sealing plate 1b. Exterior can 1a is manufactured by deep drawing a metal plate of, for example, aluminum or an aluminum alloy. Similarly to exterior can 1a, sealing plate 1b is made of a metal plate of, for example, aluminum or an aluminum alloy. Sealing plate 1b is inserted into the opening of exterior can 1a, and by irradiating a boundary between the outer periphery of sealing plate 1b and the inner periphery of exterior can 1a with a laser beam, sealing plate 1b is laser welded and airtightly fixed to exterior can 1a.

(Electrode Terminal 2)

In secondary battery cell 1, sealing plate 1b being a top face is used as a terminal face, and positive and negative electrode terminals 2 are fixed to both ends of the terminal face. Electrode terminal 2 has a columnar protrusion. However, the protrusion does not necessarily have to be columnar, and may be polygonal or elliptical.

Positive and negative electrode terminals 2 fixed to sealing plate 1b of secondary battery cell 1 are positioned such that the positive electrode and the negative electrode become symmetrical. With this configuration, secondary battery cells 1 are flipped horizontally and stacked, and the positive electrode and the negative electrode of electrode terminals 2 that are adjacent to each other are connected by the bus bars, so that adjacent secondary battery cells 1 can be connected in series.

(Battery Stack 10)

The plurality of secondary battery cells 1 are stacked in a manner that the thickness direction of each secondary battery cell 1 is the stacking direction, to form battery stack 10. In battery stack 10, the plurality of secondary battery cells 1 are stacked such that the terminal faces provided with positive and negative electrode terminals 2, or sealing plates 1b in FIG. 2, are flush with each other.

Battery stack 10 has insulating spacer 16 interposed between secondary battery cells 1 stacked adjacent to each other. Insulating spacer 16 is made of an insulating material such as resin in the form of a thin plate or sheet. Insulating spacer 16 has a plate shape having a size substantially equal to an opposing face of secondary battery cell 1. Insulating spacer 16 is stacked between secondary battery cells 1 adjacent to each other to insulate adjacent secondary battery cells 1 from each other. As the spacer disposed between adjacent secondary battery cells 1, a spacer having a shape in which a flow path of a cooling gas is formed between secondary battery cell 1 and the spacer can also be used. Further, the surface of the secondary battery cell 1 can be covered with an insulating material. For example, the surface of the exterior can excluding the electrode portion of the secondary battery cell may be heat-welded with a shrink tube of, for example, polyethylene terephthalate (PET) resin. In this case, the insulating spacer may be omitted. Further, in a power supply device in which a plurality of secondary battery cells are connected in multiple parallel and multiple series, the secondary battery cells connected in series to each other are insulated by interposing the insulating spacer between the secondary battery cells, but in the secondary battery cells connected in parallel to each other, the insulating spacer between these secondary battery cells can be omitted because the voltage difference does not occur between the adjacent exterior cans.

Further, in power supply device 100 shown in FIG. 2, end plates 20 are disposed on both end faces of battery stack 10. End face spacer 17 may also be interposed between end plate 20 and battery stack 10 to insulate the two. End face spacer 17 can also be manufactured in the form of a thin plate or sheet with an insulating material such as resin.

In battery stack 10, the metal bus bars are connected to positive and negative electrode terminals 2 of adjacent secondary battery cells 1, and the plurality of secondary battery cells 1 are connected in parallel or in series via the bus bars. In battery stack 10, the plurality of secondary battery cells 1 are stacked in a manner that, in the plurality of secondary battery cells 1 connected in parallel to each other to constitute a parallel battery group, positive and negative electrode terminals 2 provided on both ends of terminal faces 1X are positioned on the same side in the left and right direction, and in the secondary battery cells 1 respectively constituting the parallel battery groups and connected in series to each other, positive and negative electrode terminals 2 provided on both ends of terminal faces 1X are positioned on the opposite side in the left and right direction. However, the present invention does not specify a number of secondary battery cells constituting the battery stack and a connection state thereof. The number of secondary battery cells constituting the battery stack and the connection state thereof can be variously changed, in the exemplary embodiments including other exemplary embodiments described later.

In power supply device 100 according to the exemplary embodiment, in battery stack 10 in which the plurality of secondary battery cells 1 are stacked with each other, electrode terminals 2 of the plurality of secondary battery cells 1 adjacent to each other are connected to each other by the bus bars to connect the plurality of secondary battery cells 1 in parallel and in series. Further, a bus bar holder may be disposed between battery stack 10 and the bus bars. By using the bus bar holder, the plurality of bus bars can be disposed at a fixed position on the upper face of the battery stack while keeping the plurality of bus bars insulated from each other and keeping the terminal faces of the secondary battery cells insulated from the bus bars.

(Bus Bar)

The bus bar is manufactured by cutting and processing a metal plate into a predetermined shape. For the metal plate forming the bus bar, metal having a low electric resistance and being lightweight can be used, such as aluminum or copper, or an alloy thereof. However, for the metal plate of the bus bar, other metals or their alloys having a low electric resistance and being lightweight can also be used.

(End Plate 20)

As shown in FIGS. 1 to 3, end plates 20 are disposed at both ends of battery stack 10 and are fastened using a pair of left and right fastening members 15 disposed along both side faces of battery stack 10. End plates 20 are disposed on the outside of end face spacer 17, which are both ends in the stacking direction of secondary battery cells 1 of battery stack 10, and sandwich battery stack 10 from both ends.

(Step 20b)

End plate 20 has step 20b formed, for locking locking block 15b in a state of being fastened by fastening member 15. Step 20b is formed in a size that can be locked with locking block 15b of fastening member 15 described later. In the example of FIG. 2, brim-shaped step 20b is formed such that end plate 20 has a T-shape in horizontal sectional view. In addition, end plate screw hole 20c is opened in the vicinity of step 20b.

(Fastening Member 15)

Fastening member 15 is fixed at both ends to end plates 20 disposed on both end faces of the battery stack 10. End plates 20 are fixed by a plurality of fastening members 15 to fasten battery stack 10 in the stacking direction. Fastening members 15 are metal plates each having a predetermined width and a predetermined thickness and disposed along the upper face of battery stack 10, and are disposed so as to oppose both upper and lower faces of battery stack 10. A metal plate of such as iron, preferably a steel plate, can be used as fastening member 15. Fastening member 15 made of a metal plate is bent by press molding or the like to form a predetermined shape.

Figure 4:
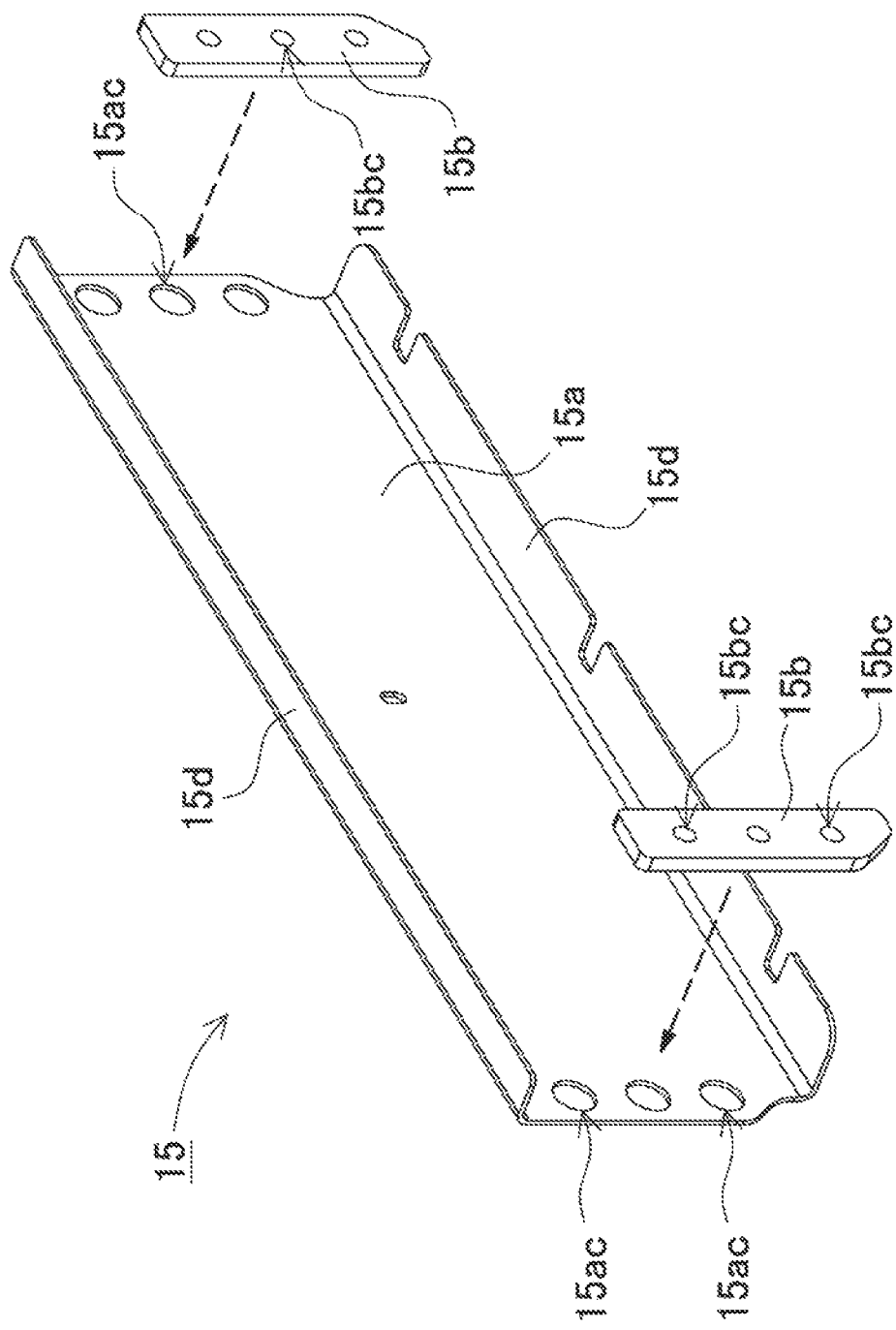
FIG. 4 is an exploded perspective view of a fastening member of FIG. 2.

An exploded perspective view of fastening member 15 is shown in FIG. 4. Fastening member 15 shown in this drawing includes fastening main face 15a and block-shaped locking blocks 15b. Fastening main face 15a is a plate-shaped member, which is bent in a channel-shape at upper and lower parts to form bent pieces 15d. Upper and lower bent pieces 15d cover the upper and lower faces of battery stack 10 from the corners on the left and right side faces of battery stack 10.

Each of locking blocks 15b is fixed to the corner of fastening main face 15a. Locking block 15b has fastening side through hole 15bc opened so as to align with end plate screw hole 20c in a state of end plate 20 being fastened thereto. Further, fastening main face 15a has fastening main face side through hole 15ac opened at a position aligning with fastening side through hole 15bc. Fastening side through hole 15bc and fastening main face side through hole 15ac are designed to align with each other in a state of the locking block 15b being fixed to fastening main face 15a.

A plurality of fastening side through holes 15bc opened in locking block 15b are opened along the extending direction of locking block 15b. Similarly, a plurality of fastening main face side through holes 15ac are opened along the end edge of fastening main face 15a or along the extending direction of locking block 15b. A plurality of end plate screw holes 20c are also formed along the side face of end plate 20 accordingly.

Locking block 15b is fixed to the outer peripheral face of end plate 20 using a plurality of bolts 15f. Fastening main face 15a, locking block 15b, and end plate 20 are not necessarily fixed by screwing with bolts, and may be fixed with, for example, pins or rivets.

Fastening main face 15a and locking block 15b can be any of iron, an iron alloy, steel use stainless (SUS), aluminum, or an aluminum alloy. Further, locking block 15b can have a width of 10 mm or more in the battery stacking direction. Furthermore, end plate 20 can be made of metal.

Preferably, locking block 15b and fastening main face 15a are made of the same metal. As a result, locking block 15b and fastening main face 15a can be easily welded.

In this way, fastening member 15 is not bent at the left and right ends in the longitudinal direction, that is, not bent in the stacking direction of the layers of battery stack 10 and screwed from the main face side of the end plate 20, but as shown in FIGS. 1 to 3, fastening member 15 is formed flat in the stacking direction of battery stack 10 and is not provided with the bent part, and battery stack 10 is fastened by the locking structure and screwing by locking block 15b and step 20b. Therefore, the stiffness can be increased and the risk of breakage due to expansion of the secondary battery cell can be mitigated.

The power supply device in which a large number of secondary battery cells 1 are stacked is configured to restrain the plurality of secondary battery cells 1 by connecting end plates 20 disposed at both ends of battery stack 10 constituted of the plurality of secondary battery cells 1 with fastening members 15. By restraining the plurality of secondary battery cells 1 using end plates 20 and fastening members 15 having high stiffness, malfunctions due to expansion, deformation, relative movement, and vibration of secondary battery cells 1 due to charging and discharging and deterioration can be suppressed.

Figure 14:
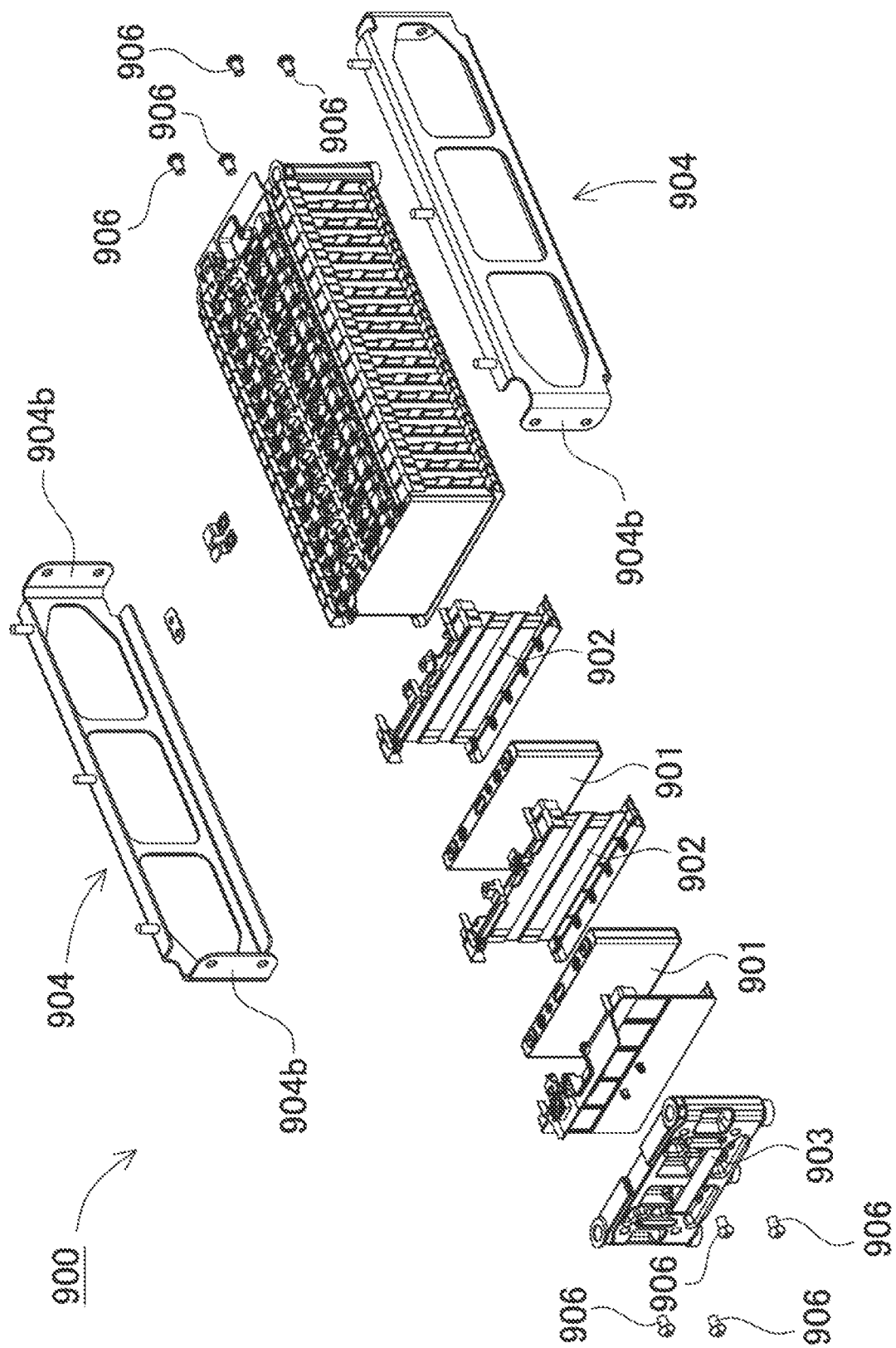
FIG. 14 is an exploded perspective view showing a conventional power supply device.

On the other hand, in the conventional power supply device in which both ends of the battery stack are fixed by end plates, an L-shaped part in which the end of a bind bar constituting the fastening member is bent inward is fixed to the outer side face of the end plate. For example, in power supply device 900 shown in an exploded perspective view of FIG. 14, a large number of quadrangular secondary battery cells 901 are stacked with spacers 902 interposed therebetween, have end plates 903 disposed on end faces thereof, and are fastened with bind bars 904. Spacer 902 is made of a hard resin or the like. As shown in this drawing, both ends of bind bar 904 are bent to form an L shape, and L-shaped part 904b is fixed to the main face side of end plate 903 with bolts 906.

In the above structure, each end of the metal plate fastening member is bent into an L shape to form the L-shaped part, and this L-shaped part is fixed to the outer surface of the end plate, and therefore, the L-shaped part becomes a metal plate with the same thickness as the fastening member. As the fastening member, a metal plate having tensile strength that can withstand the tensile force generated by the expansion force of secondary battery cell 1 is used. The tensile strength of the metal plate is considerably stronger than the bending strength, and a metal plate of, for example, about 1 mm to 2 mm is used for the fastening member. The bending stress acts on the L-shaped part fixed to the outer surface of the end plate due to the tensile force of the fastening member, but because the bending stress of the metal plate used for the end plate is considerably weaker than the tensile stress, a bent part of the L-shaped part is deformed and broken by exceeding the bearing strength and breaking strength due to the bending stress acting on the L-shaped part. If there is no gap between the bent part of the L-shaped part and the end plate, the inner side face of the bent part will come into contact with the corner of the end plate, and the assembling cannot be performed.

Figure 15:
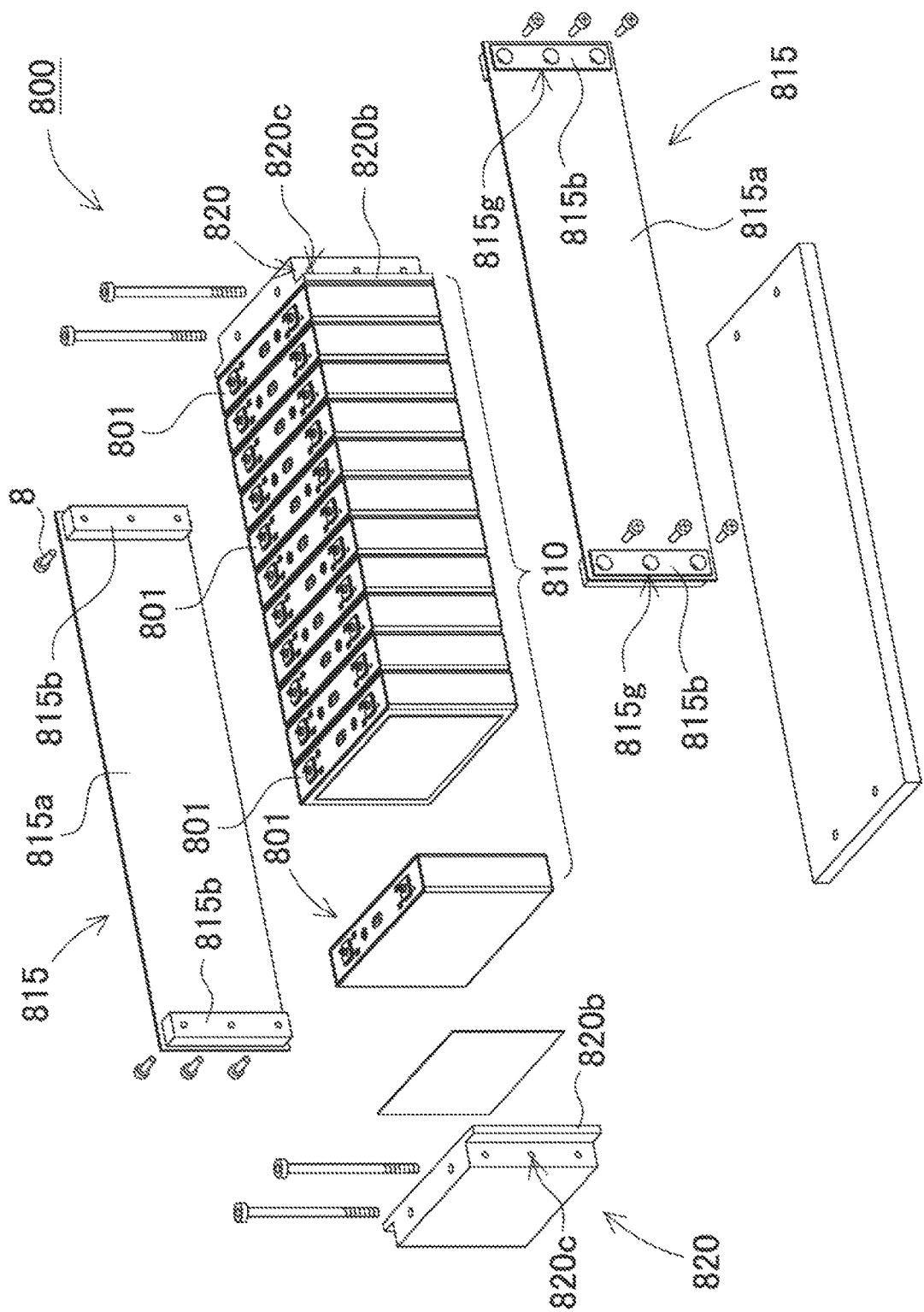
FIG. 15 is an exploded perspective view showing a power supply device previously developed by the applicant of the present application.

In this way, the increase in tensile force applied to the fastening member causes strong stress to be locally concentrated on the inside of the bent part of the fastening member and the corner of the end plate, and causes deformation and damage of the fastening member and the end plate. Therefore, the applicant of the present application has developed power supply device 800 shown in FIG. 15. Power supply device 800 includes battery stack 810 constituted by stacking a plurality of secondary battery cells 801, a pair of end plates 820 disposed at both ends of battery stack 810 in the stacking direction, and fastening members 815 connected at both ends to the pair of end plates 820. Fastening member 815 has fastening main face 815a extending in the stacking direction of battery stack 810, and locking blocks 815b provided on fastening main face 815a and protruding toward the opposing face to the outer peripheral face of end plate 820. Locking block 815b is fixed to the inner peripheral face of fixing hole 815g in a state of being inserted into fixing hole 815g provided on fastening main face 815a. End plate 820 has fitting part 820c on the outer peripheral face on which the locking block 815b is guided, and on the portion of end plate 820 closer to battery stack 810 of fitting part 820c, is provided with protruding step 820b that is engaged with locking block 815b. In power supply device 800, locking block 815b is guided to fitting part 820c, and locking block 815b is also fixed to the outer peripheral face of end plate 820.

The power supply device having this structure guides the locking block to the fitting part, prevents the displacement by a stopper, and further fixes the locking block to the end plate. Therefore, the fastening member can be fixed to the end plate using the locking block and the stopper without causing deformation due to the bending stress as in the L-shaped part of the conventional fastening member. In particular, because the locking block is guided to the fitting part of the end plate and the stopper prevents the displacement, the deformation of the fastening member and the end plate due to the strong tensile force acting on the fastening member is prevented, and the end plate can be suppressed from moving.

Figure 16:
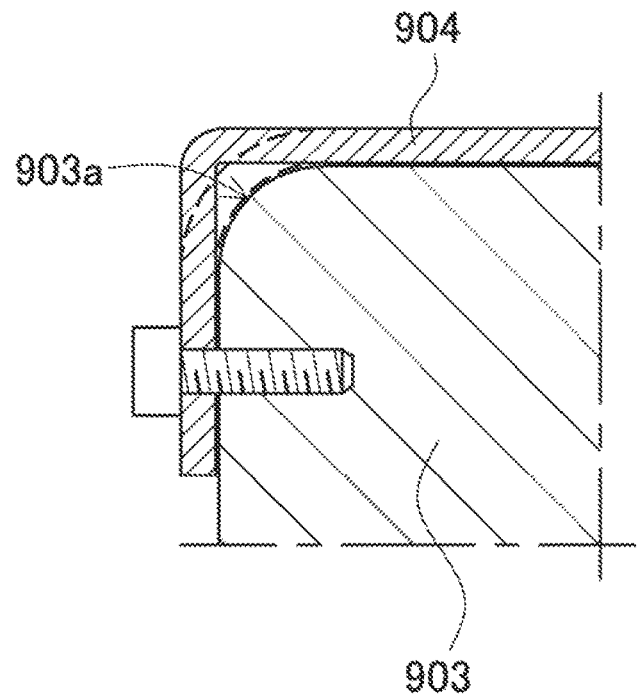
FIG. 16 is an enlarged sectional view showing a bent part of a fastening member of the conventional power supply device.

Strong tensile force acts on the fastening member as a reaction of the expansion force of the secondary battery cell, but in conventional power supply device 900, the tensile force of bind bar 904 constituting the fastening member acts as the bending stress in the bent part to cause deformation. When bind bar 904 is deformed by the bending stress, bind bar 904 is in a substantially stretched state in FIG. 16 with the inner side face of the bent part being brought into close contact with corner 903a of end plate 903. The bind bar may break in this state by exceeding the bearing strength and the breaking strength of the material.

On the other hand, in the power supply device having the above structure, the locking block provided on the fastening member is guided to the fitting part of the end plate, and the misalignment of the locking block guided to the fitting part is prevented by the stopper. Even if there is a gap between the locking block and the end plate, the fastening member fixed to the end plate with this structure does not support the locking block with the bending stress of the L-shaped part as in the conventional example, but supports the locking block with shear stress of the fastening member by a structure in which the locking block is guided to the fitting part and is disposed at a fixed position by the stopper. The fastening member has strength against the shear stress considerably stronger than against the tensile force, and suppresses the movement of the end plate without being deformed by the strong tensile force acting on the fastening member.

Figure 17:
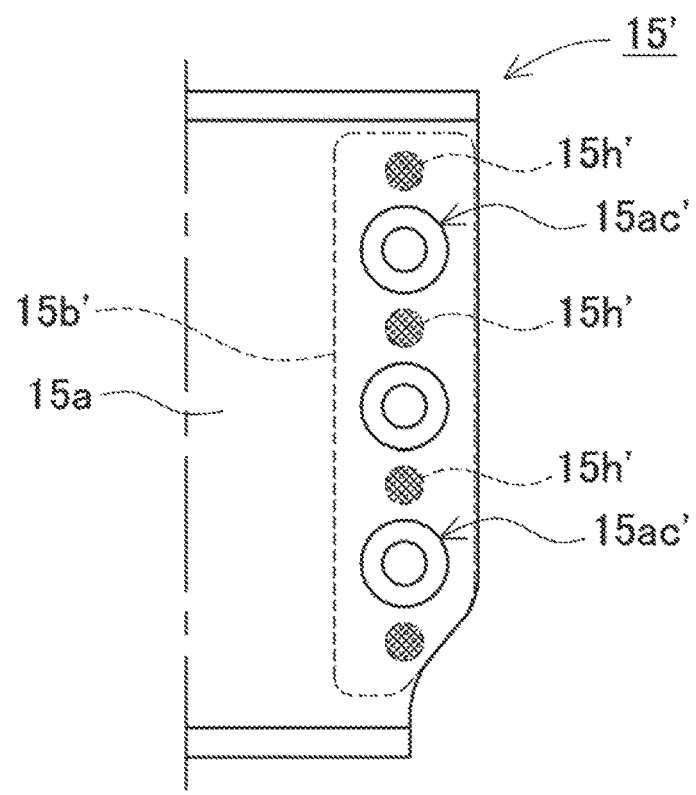
FIG. 17 is a partially transparent side view showing an example of a welding position for welding the locking block to the fastening main face.

On the other hand, in the fastening member constituted of the fastening main face and the locking block, the fastening main face needs to be fixed with the locking block. In general, the fastening main face and the locking block made of metal members are often welded and fixed by spot welding with laser light. In this case, the position of performing the spot welding is set so as to avoid the screwing position. Therefore, generally, as shown in a side view of FIG. 17, fixing region 15h' being the welding position will be set approximately at the center of locking block 15b' of fastening member 15' in the width. By performing the spot welding in fixing region 15h', a joint where locking block 15b' and fastening member 15' are melted and joined is formed in fixing region 15h', and whereby locking block 15b' and fastening member 15' are joined.

However, in this configuration, the stress applied when the secondary battery cell expands at the time of fastening the battery stack is generated from fixing region 15h' where spot welding is performed, and is transmitted to the vicinity thereof. As a result, fastening main face side through hole 15ac' being the screwing position where the screw hole is opened may also have the stress to be easily concentrated, causing a concern that the progress of breakage may occur in fastening member 15'.

Figure 5:
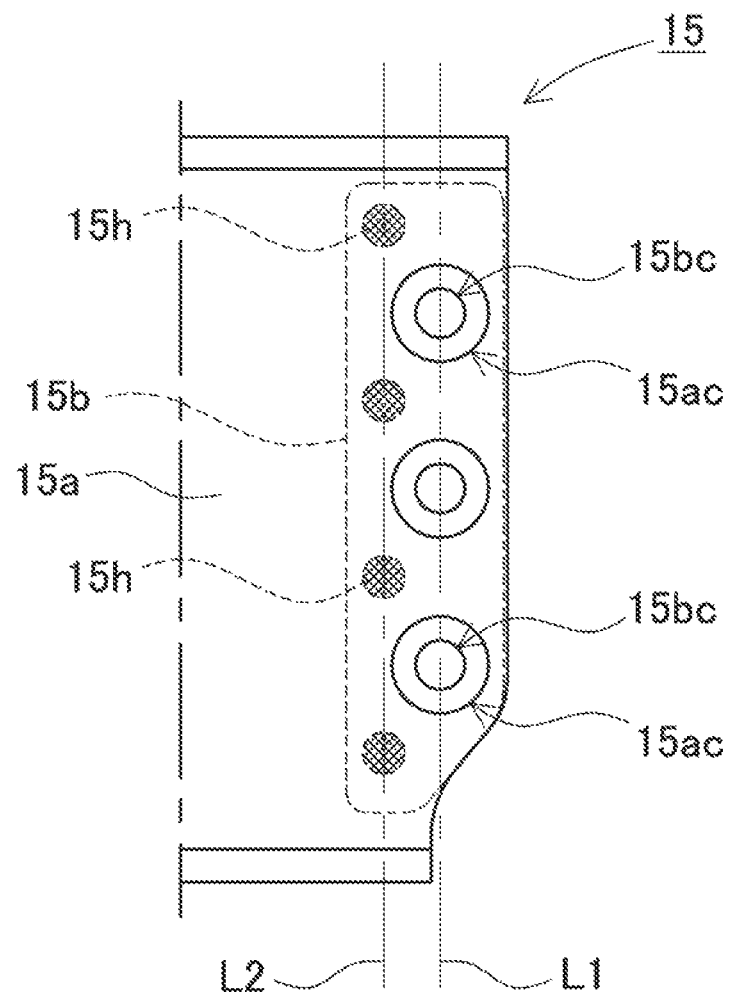
FIG. 5 is a partially transparent side view showing an example of welding a locking block to a fastening main face.

On the other hand, in the present exemplary embodiment, as shown in a side view of FIG. 5, fixing region 15h fixing locking block 15b to fastening main face 15a is offset so as to be shifted from fastening side through hole 15bc. As a result, the distance between fastening side through hole 15bc opened in locking block 15b and fixing region 15h can be increased, and the stress concentration can be mitigated. Further, by locating fixing region 15h not on first straight line L1 connecting the screw holes but on second straight line L2 shifted from first straight line L1, a large spot welding area can be secured. Because the screw hole is circular, a large area can be easily secured by being offset, and as a result of increasing the spot welding area, the welding strength is also increased.

Figure 6:
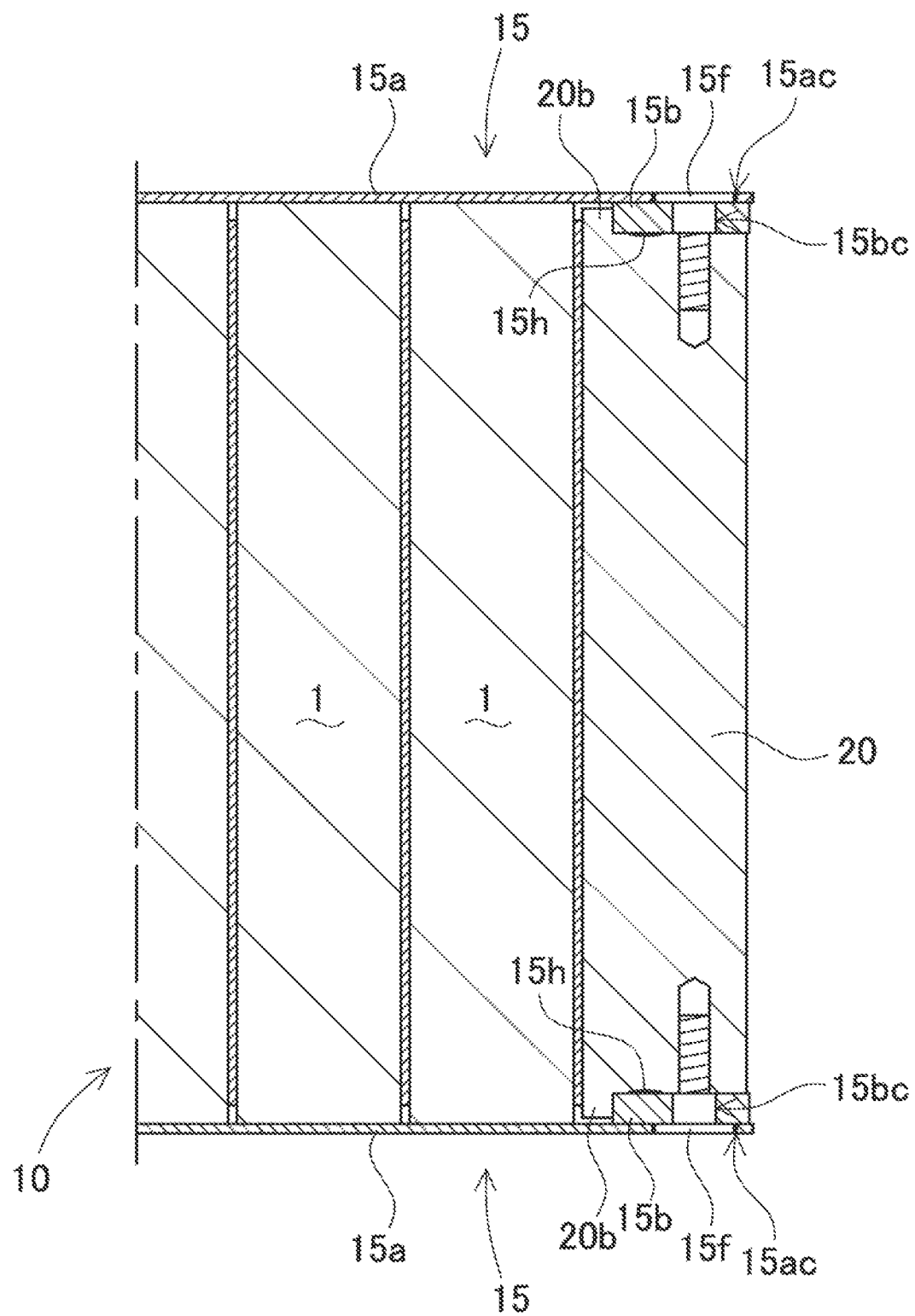
FIG. 6 is a horizontal sectional view showing a positional relationship between a fixing region and a screw hole.

At this time, a direction of offsetting fixing region 15h is preferably a direction separating further away from end plate 20 than fastening side through hole 15*bc*. In the example of the side view shown in FIG. 5, a plurality of fixing regions 15*h* are offset toward the center of battery stack 10. With this configuration, as shown in FIG. 6, the stress during expansion of secondary battery cell 1 can be received in each fixing region 15*h*, which contributes to the dispersion of the applied stress and helps to improve the stiffness of fastening member 15.

As described above, according to power supply device 100 according to the present exemplary embodiment, the stress that is caused by the expansion of secondary battery cell 1 and tends to spread in the battery stacking direction is applied to, in addition to fastening main face 15*a* itself, each of the members involved in engagement between step 20*b* and locking block 15*b*, welding between fastening main face 15*a* and locking block 15*b*, and screwing by bolt 15*f*. Therefore, by increasing the stiffness of each of these members and appropriately dispersing the stress, it becomes possible to achieve power supply device 100 that can increase the stiffness as a whole and is adaptable to the expansion and contraction of secondary battery cell 1.

Second Exemplary Embodiment

Figure 7:
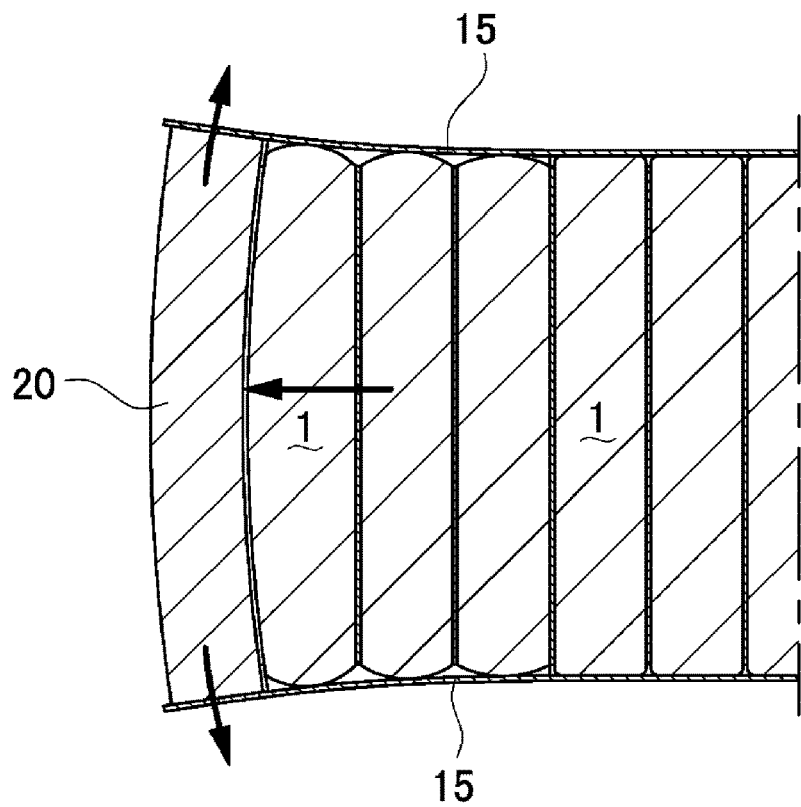
FIG. 7 is a schematic horizontal sectional view showing how the fastening member is deformed by the reaction force of a secondary battery cell.
Figure 8:
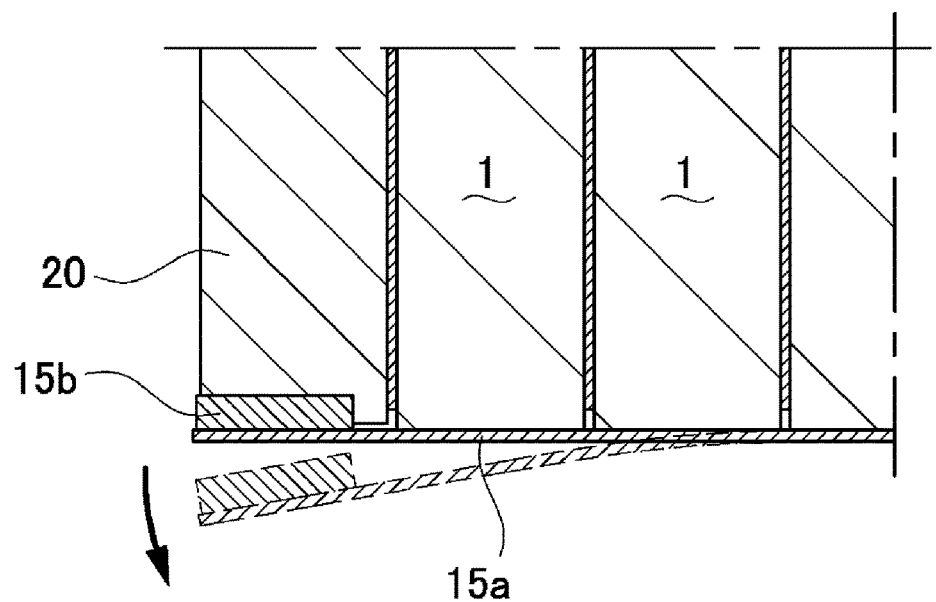
FIG. 8 is an enlarged sectional view of a main part of FIG. 7.

It is also possible to intentionally reduce the stiffness of the locking plate. As shown in FIG. 7, when tensile force due to reaction force is generated during expansion of secondary battery cell 1, fastening member 15 also tries to deform in the expanding direction in response to the tensile force. In this case, as shown in an enlarged sectional view of FIG. 8, locking block 15*b* is thicker and stiffer than fastening main face 15*a*. For this reason, almost all of the bending load is received on fastening main face 15*a* instead of locking block 15*b*, which is disadvantageous in terms of strength. Therefore, by intentionally reducing the stiffness of locking block 15*b*, the difference in stiffness between locking block 15*b* and fastening main face 15*a* is reduced to make the stress be received also on locking block 15*b*. Accordingly, the concentration of stress on fastening main face 15*a* can be mitigated and the stiffness can be increased as a whole.

Figure 9:
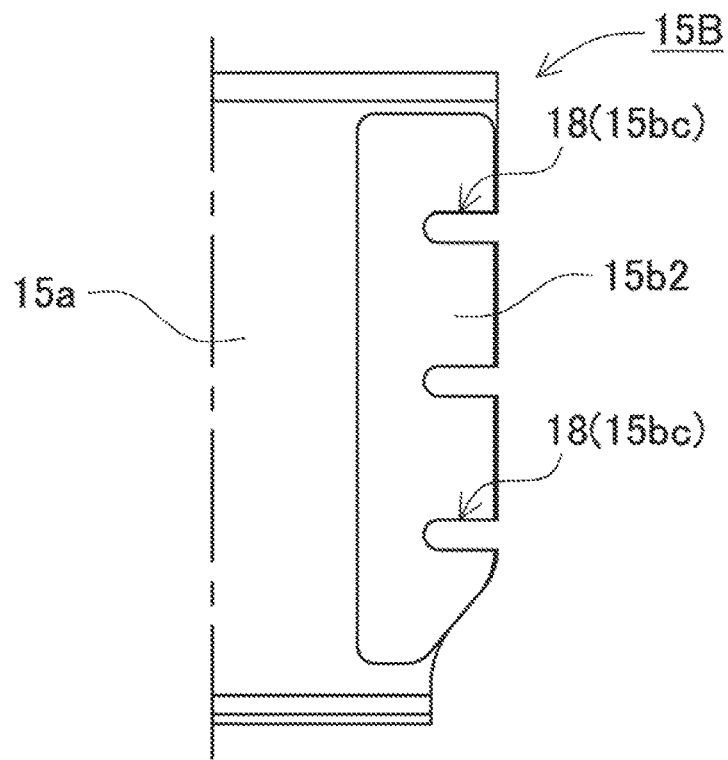
FIG. 9 is an enlarged sectional view of a main part showing a fastening member of a power supply device according to a second exemplary embodiment.

As an example as such, FIG. 9 shows a view of fastening member 15B according to the second exemplary embodiment from the side on which locking block 15*b*2 is provided. In fastening member 15B shown in this drawing, fastening side through hole 15*bc* is formed in a notch shape to form notch 18. Here, notch 18 is formed in a direction in which an end edge on the side of locking block 15*b*2 facing end plate 20 is opened. With this configuration, the stiffness of locking block 15*b*2 can be relatively reduced, and the stress received can be shared with fastening main face 15*a*, thereby the situation in which the stress is concentrated on fastening main face 15*a* can be avoided, and the resistance can be increased.

Third Exemplary Embodiment

Figure 10:
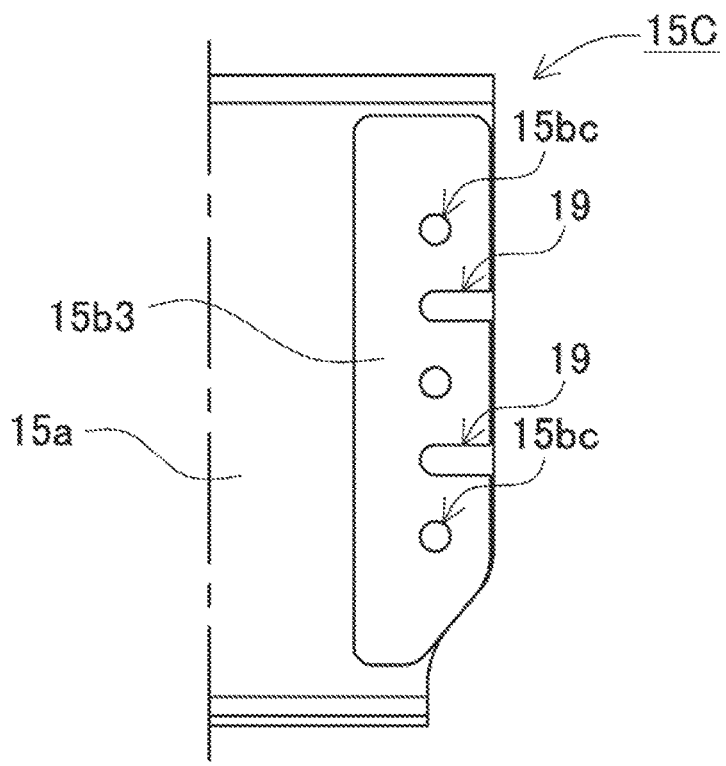
FIG. 10 is an enlarged cross-sectional view of a main part showing a fastening member of a power supply device according to a third exemplary embodiment.

Further, the configuration for intentionally reducing the stiffness of the locking plate is not limited to the configuration of extending fastening side through hole 15*bc* as described above. For example, a notch, a constriction, a through hole, or the like may be formed separately from fastening side through hole 15*bc*. For example, FIG. 10 shows fastening member 15C according to a third exemplary embodiment. Fastening member 15C shown in this drawing has one or more second notches 19 that open an end edge on the side facing end plate 20 at positions different from fastening side through hole 15*bc* of locking block 15*b*3.

With this configuration, by relatively reducing the stiffness of locking block 15*b*3, the stress received can be shared with fastening main face 15*a*, thereby the situation in which the stress is concentrated on fastening main face 15*a* can be avoided, and the resistance can be increased.

The above power supply device can be used as a vehicle-mounted power supply. As a vehicle equipped with a power supply device, an electric vehicle such as a hybrid vehicle or a plug-in hybrid vehicle that runs with both an engine and a motor, or an electric vehicle that runs only with a motor can be used, and the power supply device is used as a power supply for these vehicles. In addition, an example in which large-capacity and high-output power supply device 100 is constructed is described, the power supply device being constituted by connecting a large number of the above-described power supply devices in series or in parallel and adding a necessary control circuit in order to obtain the electric power for driving the vehicle.

Power Supply Device for Hybrid Vehicle

Figure 11:
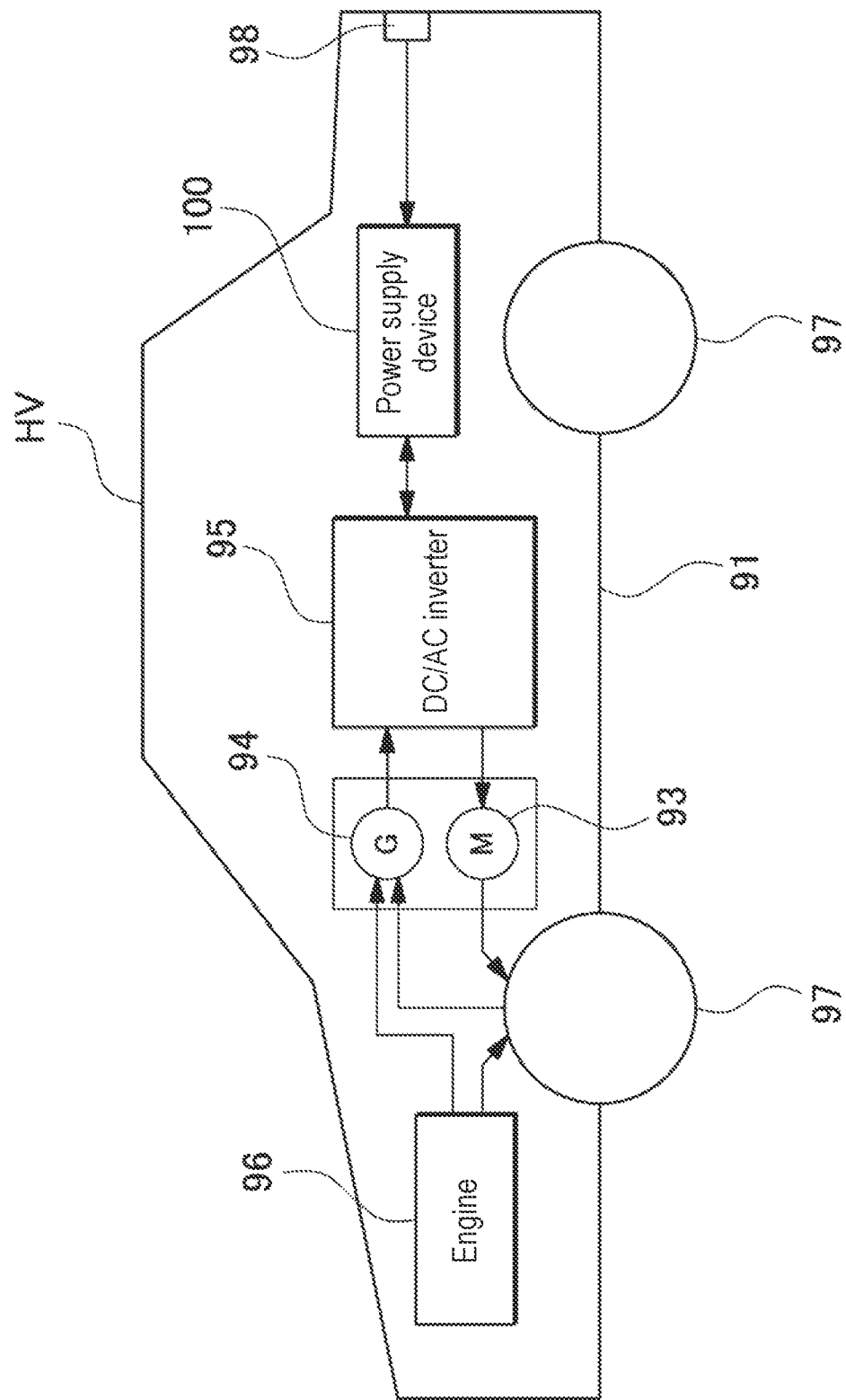
FIG. 11 is a block diagram showing an example in which the power supply device is mounted on a hybrid vehicle that runs on an engine and a motor.

FIG. 11 shows an example in which a power supply device is mounted on a hybrid vehicle that runs with both an engine and a motor. Vehicle HV mounted with the power supply device shown in this drawing includes vehicle body 91, engine 96 and running motor 93 for running vehicle body 91, wheels 97 driven by engine 96 and running motor 93, power supply device 100 that supplies electric power to motor 93, and generator 94 that charges a battery of power supply device 100. Power supply device 100 is connected to motor 93 and generator 94 via direct current to alternating current (DC/AC) inverter 95. Vehicle HV runs with both motor 93 and engine 96 while charging and discharging the battery of power supply device 100. Motor 93 is driven to run the vehicle in a region where the engine efficiency is low, for example, when accelerating or running at a low speed. Motor 93 is driven by being supplied with electric power from power supply device 100. Generator 94 is driven by engine 96 or by regenerative braking when the vehicle is braked to charge the battery of power supply device 100. As shown in FIG. 11, vehicle HV may be provided with charging plug 98 for charging power supply device 100. By connecting this charging plug 98 to an external power supply, power supply device 100 can be charged.

(Power Supply Device for Electric Vehicle)

Figure 12:
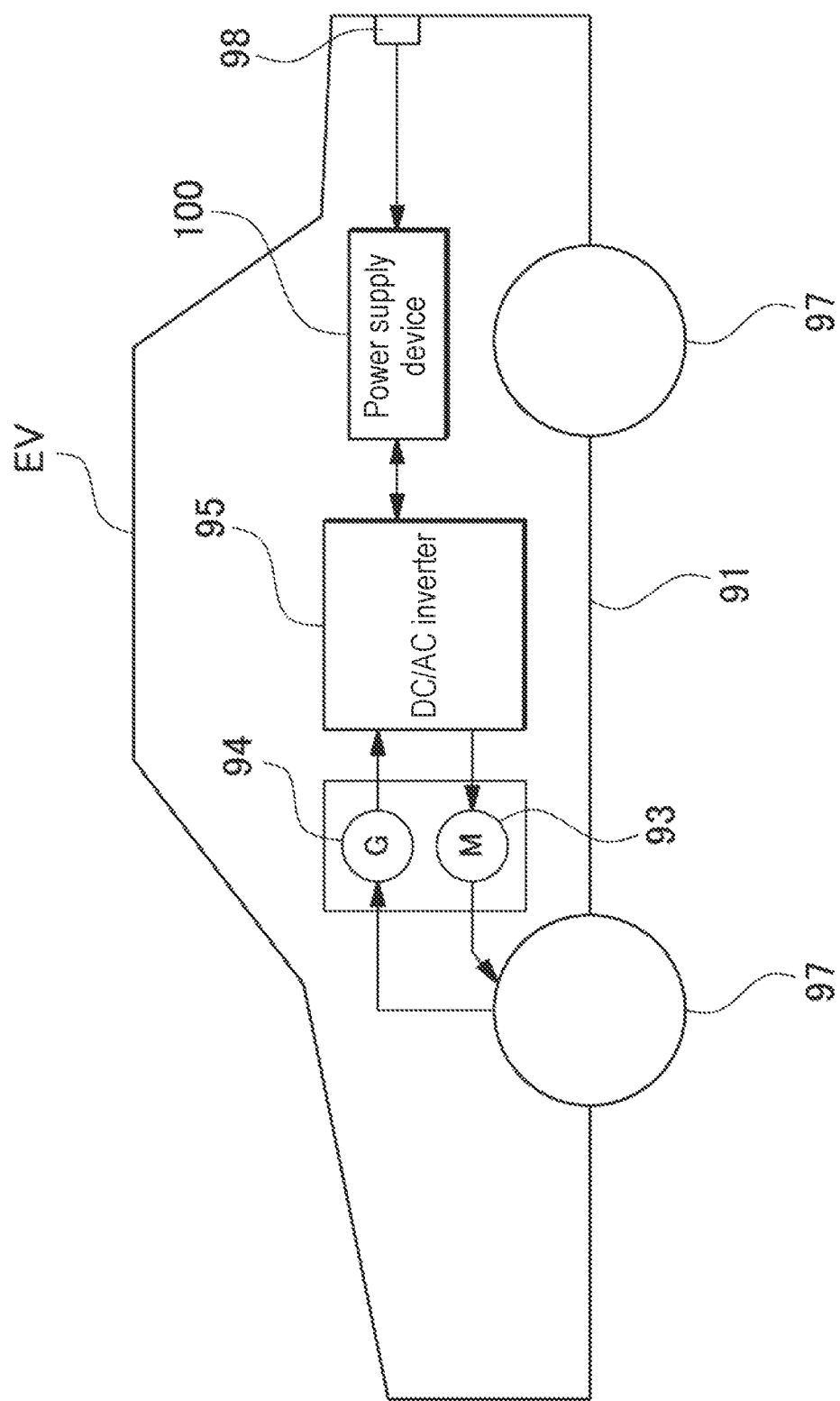
FIG. 12 is a block diagram showing an example in which the power supply device is mounted on an electric vehicle that runs only on a motor.

Further, FIG. 12 shows an example in which a power supply device is mounted on an electric vehicle that runs only with a motor. Vehicle EV mounted with the power supply device shown in this drawing includes vehicle body 91, running motor 93 for running vehicle body 91, wheels 97 driven by motor 93, power supply device 100 that supplies electric power to motor 93, and generator 94 that charges the battery of power supply device 100. Power supply device 100 is connected to motor 93 and generator 94 via direct current to alternating current (DC/AC) inverter 95. Motor 93 is driven by being supplied with electric power from power supply device 100. Generator 94 is driven by the energy used for regenerative braking of vehicle EV to charge the battery of power supply device 100. In addition, vehicle EV is equipped with charging plug 98, and charging plug 98 can be connected to an external power supply to charge power supply device 100.

(Power Storage System)

Figure 13:
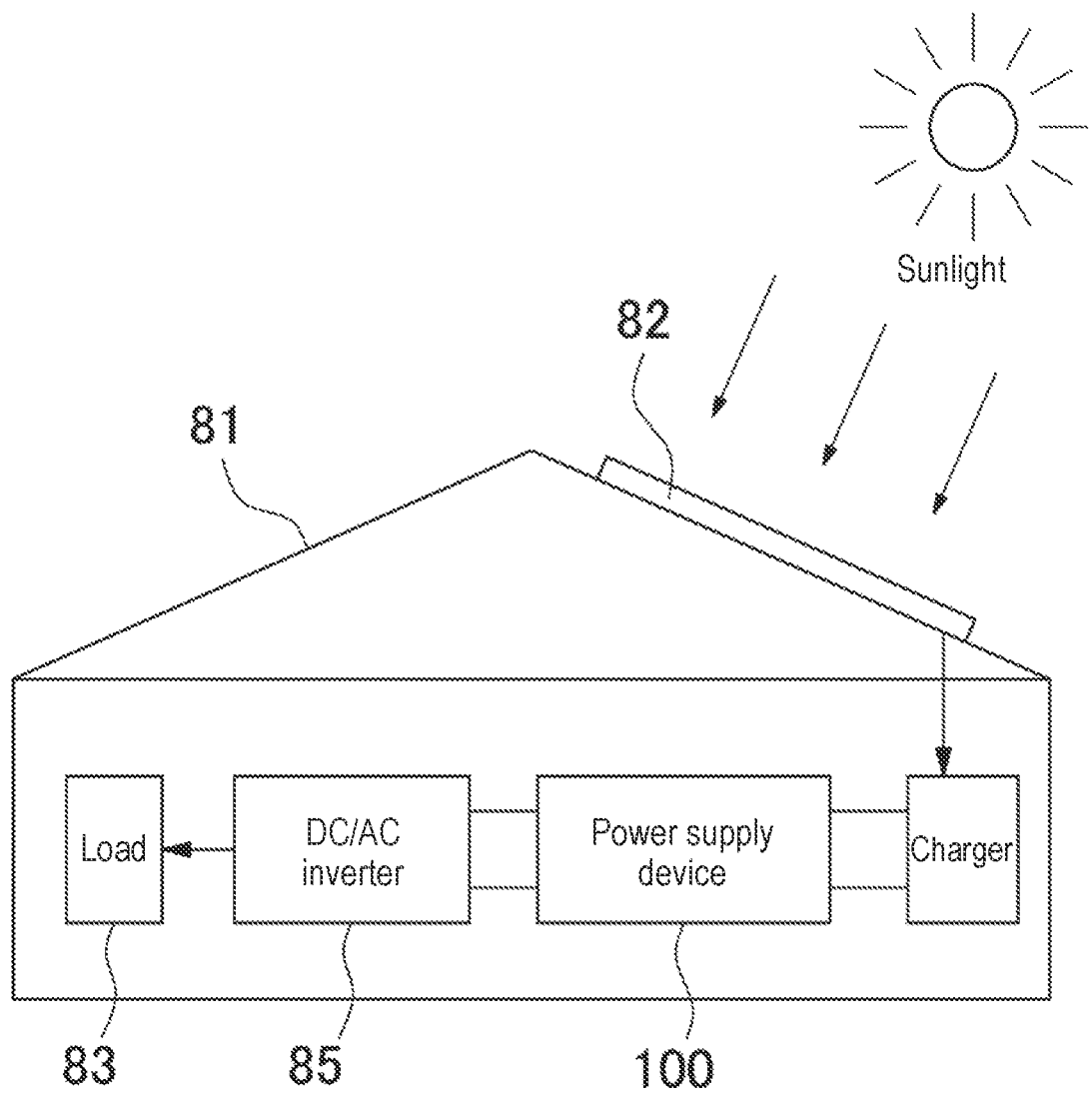
FIG. 13 is a block diagram showing an example applied to a power supply device for storing power.

Furthermore, the present invention does not specify the use of the power supply device as the power supply of the motor that runs the vehicle. The power supply device according to the exemplary embodiments can also be used as a power supply for a power storage system that charges a battery and stores power with electric power generated by solar power generation, wind power generation, or the like. FIG. 13 shows a power storage system in which a battery of power supply device 100 is charged with a solar cell to store power. As shown in the drawing, the power storage system shown in this drawing charges the battery of power supply device 100 with electric power generated by solar cell 82 disposed on the roof or the roof floor of building 81 such as a house or a factory. Furthermore, this power storage system supplies the electric power stored in power supply device 100 to load 83 via DC/AC inverter 85.

Further, although not shown, the power supply device can also be used as a power supply of a power storage system that charges a battery and stores power by utilizing midnight power at night. The power supply device that is charged with the midnight power can limit the peak power during the daytime to a small value by performing charging with the midnight power that is the surplus power of the power plant, and outputting the power during the daytime when the power load increases. Furthermore, the power supply device can also be used as a power supply that performs the charging with both the output of the solar cell and the midnight power. This power supply device can effectively utilize both electric power generated by a solar cell and midnight electric power, and can efficiently store power in consideration of weather and power consumption.

The power storage system as described above can be suitably used in applications including a backup power supply device that can be installed in a rack of a computer server, a backup power supply device for a wireless base station for a mobile phone or the like, a power storage power supply for use in a house or a factory, a street light power supply or the like, a power storage device combined with a solar cell, and a backup power supply for traffic lights and traffic indicators on roads.

INDUSTRIAL APPLICABILITY

The power supply device according to the present invention, a vehicle equipped with the power supply device, and a buffer are suitably used as a large current power supply used for a power supply of a motor for driving an electric vehicle such as a hybrid vehicle, a fuel cell vehicle, an electric vehicle, or an electric motorcycle. As an example, a power supply device for a plug-in hybrid electric vehicle and a hybrid type electric vehicle that can switch between an electric vehicle (EV) running mode and a hybrid electric vehicle (HEV) running mode, an electric vehicle, or the like can be mentioned. In addition, the power supply device can be appropriately used in applications including a backup power supply device that can be installed in a rack of a computer server, a backup power supply device for a wireless base station for a mobile phone or the like, a power storage power supply for use in a house or a factory, a street light power supply or the like, a power storage device combined with a solar cell, and a backup power supply for traffic lights or the like.

REFERENCE MARKS IN THE DRAWINGS 100,800: power supply device
1,801: secondary battery cell
1X: terminal face
1a: exterior can
1b: sealing plate
2: electrode terminal
10,810: battery stack
15, 15B, 15C, 15', 815: fastening member
15a, 815a: fastening main face
15b, 15b2, 15b3, 15b', 815b: locking block
15ac, 15ac': fastening main face side through hole
15bc: fastening side through hole
15d: bent piece
15f: bolt
815g: fixing hole
15h, 15h': fixing region
16: insulating spacer
17: end face spacer
18: notch
19: second notch
20, 820: end plate
20b, 820b: step
820c: fitting part
20c: end plate screw hole
81: building
82: solar cell
83: load
85: DC/AC inverter
91: vehicle body
93: motor
94: generator
95: DC/AC inverter
96: engine
97: wheel
98: charging plug
900: power supply device
901: secondary battery cell
902: spacer
903: end plate
903a: corner
904: bind bar
904b: L-shaped part
906: bolt
L1: first straight line
L2: second straight line
HV, EV: vehicle

The invention claimed is:

1. A power supply device comprising:
a battery stack formed by stacking a plurality of secondary battery cells;
a pair of end plates disposed on both ends in a stacking direction of the battery stack; and
a plurality of fastening members fastening the pair of end plates together, wherein
each of the plurality of fastening members includes:
 a fastening main face having a flat plate shape; and
 a locking block fixed to a corner of the fastening main face,
each of the pair of end plates includes:
 a step that locks the locking block while being fastened by a corresponding one of the plurality of fastening members; and
 an end plate screw hole opened near the step,
each of the plurality of fastening members includes:
 a fastening side through hole opened to align with the end plate screw hole, while the fastening member has a corresponding one of the pair of end plates fastened; and
 a fixing region at which the locking block is fixed to the fastening main face, the fixing region being disposed in a direction further away from the corresponding one of the pair of end plates than the fastening side through hole is.

2. The power supply device according to claim 1, wherein the fastening side through hole includes a plurality of fastening side through holes disposed along an extending direction of the locking block.

3. The power supply device according to claim 2, wherein
the plurality of the fastening side through holes are disposed on a first straight line along the extending direction of the locking block,
the fixing region including a plurality of fixing regions fixing the locking block to the fastening main face are disposed on a second straight line different from the first straight line along the extending direction of the locking block, and
the second straight line is disposed in a direction further away from the corresponding one of the pair of end plates than the first straight line is.

4. The power supply device according to claim 1, wherein the locking block is fixed to the fastening main face by spot welding.

5. The power supply device according to claim 1, wherein the fastening side through hole has a notch shape that opens an end edge of the locking block on a side facing each of the pair of end plates.

6. The power supply device according to claim 5, wherein the locking block has one or more second notches disposed at a position different from the fastening side through hole, the one or more second notches opening the end edge of the locking block on the side facing the corresponding one of the pair of end plates.

7. The power supply device according to claim 1, wherein the locking block and the fastening main face contain metal of a same type.

8. A vehicle comprising:
the power supply device according to claim 1;
a motor for running to which power is supplied from the power supply device;
a vehicle body provided with the power supply device and the motor; and
a vehicle wheel that is driven by the motor to make the vehicle operate.

9. A power storage device comprising:
the power supply device according to claim 1; and
a power supply controller that controls charging and discharging of the power supply device, wherein
the power supply controller configured to charge the plurality of secondary battery cells and control charging of the secondary battery cells.

* * * * *